US012602074B2

(12) United States Patent
Wang et al.

(10) Patent No.: US 12,602,074 B2
(45) Date of Patent: Apr. 14, 2026

(54) ELECTRONIC DEVICE

(71) Applicant: Acer Incorporated, New Taipei City (TW)

(72) Inventors: Dong-Yu Wang, New Taipei City (TW); Chun-Hung Wen, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 149 days.

(21) Appl. No.: 18/767,975

(22) Filed: Jul. 9, 2024

(65) Prior Publication Data

US 2025/0190011 A1    Jun. 12, 2025

(30) Foreign Application Priority Data

Dec. 11, 2023    (TW) ................................. 112148172

(51) Int. Cl.
| | |
|---|---|
| *G06F 1/16* | (2006.01) |
| *G06F 3/0354* | (2013.01) |
| *H05K 5/00* | (2025.01) |
| *H05K 7/00* | (2006.01) |

(52) U.S. Cl.
CPC ........ *G06F 1/1607* (2013.01); *G06F 3/03545* (2013.01)

(58) Field of Classification Search
CPC .... G06F 1/1607; G06F 1/1613; G06F 1/1615; G06F 1/1616; G06F 1/1684; G06F 3/03545; G06F 3/0354
See application file for complete search history.

(56) References Cited

U.S. PATENT DOCUMENTS

| | | | |
|---|---|---|---|
| 9,596,914 B2 * | 3/2017 | Zaloom | G06F 1/1626 |
| 10,905,948 B1 * | 2/2021 | Nevarez | G06F 3/0393 |
| 11,632,141 B1 * | 4/2023 | Weng | H04B 1/3888 |
| | | | 455/575.8 |
| 2004/0227045 A1 * | 11/2004 | An | G06F 1/162 |
| | | | 248/278.1 |
| 2005/0168500 A1 * | 8/2005 | Lee | G06F 3/03545 |
| | | | 340/905 |
| 2009/0114458 A1 * | 5/2009 | Chen | G06F 1/1626 |
| | | | 178/19.01 |
| 2011/0148019 A1 * | 6/2011 | Lin | G06F 3/03545 |
| | | | 267/182 |
| 2012/0154998 A1 * | 6/2012 | Nonomura | G06F 1/1616 |
| | | | 361/679.01 |
| 2019/0250673 A1 * | 8/2019 | Chen | G06F 1/1616 |
| 2019/0346881 A1 * | 11/2019 | Chai | G06F 3/03545 |
| 2020/0401186 A1 * | 12/2020 | Chan | G06F 1/1679 |
| 2021/0055762 A1 * | 2/2021 | Pai | G06F 3/03545 |
| 2024/0201806 A1 * | 6/2024 | Zhao | H02J 50/10 |

* cited by examiner

*Primary Examiner* — Anthony M Haughton
(74) *Attorney, Agent, or Firm* — JCIPRNET

(57) ABSTRACT

An electronic device including a first body, a second body, a stylus, and a positioning mechanism is provided. The second body is pivotally connected to the first body and has a stylus slot. The stylus is accommodated in the stylus slot, wherein the positioning mechanism is disposed in the stylus slot and the stylus is fixed to the positioning mechanism. When the second body is unfolded relative to the first body, the positioning mechanism is adapted to move the stylus out of the stylus slot.

10 Claims, 10 Drawing Sheets

R5

210b(210)

110a(110)

132(130)

100

ELECTRONIC DEVICE

CROSS-REFERENCE TO RELATED APPLICATION

This application claims the priority benefit of Taiwan application serial no. 112148172, filed on Dec. 11, 2023. The entirety of each of the above-mentioned patent applications is hereby incorporated by reference herein and made a part of this specification.

BACKGROUND

Technical Field

The disclosure relates to an electronic device, and in particular to an electronic device having a stylus.

Description of Related Art

With the development of touch display technology, touch displays have been widely used in various types of electronic products. Take the application of the touch displays in notebook computers as an example, which provides input methods or operation methods other than keyboard, trackpad and mouse, improving the user's operational flexibility. Currently, users can use a stylus to operate the touch display to improve touch accuracy and assist in precise drawing and writing actions.

In order to facilitate the user to carry the stylus and prevent the stylus from being lost, most notebook computers are equipped with a stylus slot for storing the stylus. Generally speaking, when the stylus is accommodated and fixed in the stylus slot, the end of the stylus is exposed from the stylus slot. The user needs to hold the end of the stylus with their fingers to pull the stylus out of the stylus slot. It not only lacks operational convenience, but also makes it difficult for users to quickly extract the stylus.

SUMMARY

The present invention provides an electronic device with excellent operational convenience.

The present invention provides an electronic device including a first body, a second body, a stylus, and a positioning mechanism. The first body has a first magnetic component. The second body is pivotally connected to the first body and has a stylus slot. The stylus is accommodated in the stylus slot. The positioning mechanism is disposed in the stylus slot and comprises a positioning base, a driving part, an elastic part and a driven part. The stylus is fixed to the positioning base, and the positioning base is adapted to slide in the stylus slot. The driving part is pivotally connected to the second body and has a second magnetic component corresponding to the first magnetic component. Two ends of the elastic part are respectively connected to the driving part and the second body, and two ends of the driven part are respectively connected to the driving part and the positioning base. When the second body is folded relative to the first body, the positioning base remains in a first position, wherein the elastic part is squeezed by the driving part, and an elastic restoring force of the elastic part is less than a first magnetic attraction force generated between the second magnetic component and the first magnetic component. When the second body is unfolded relative to the first body, the elastic restoring force of the elastic part is greater than a second magnetic attraction force generated between the second magnetic component and the first magnetic component to drive the driving part to rotate, and the driven part is driven by the driving part to push the positioning base toward an opening of the stylus slot, causing the positioning base to slide to a second position.

Based on the above, when the second body is unfolded relative to the first body, the positioning mechanism can move at least part of the stylus out of the stylus slot, so that the user can quickly extract the stylus. Therefore, the electronic device of the present invention has excellent operational convenience.

In order to make the above-mentioned features and advantages of the application more obvious and easier to understand, the following embodiments are given and described in detail with the accompanying drawings as follows.

DESCRIPTION OF THE EMBODIMENTS

Figure 1A:
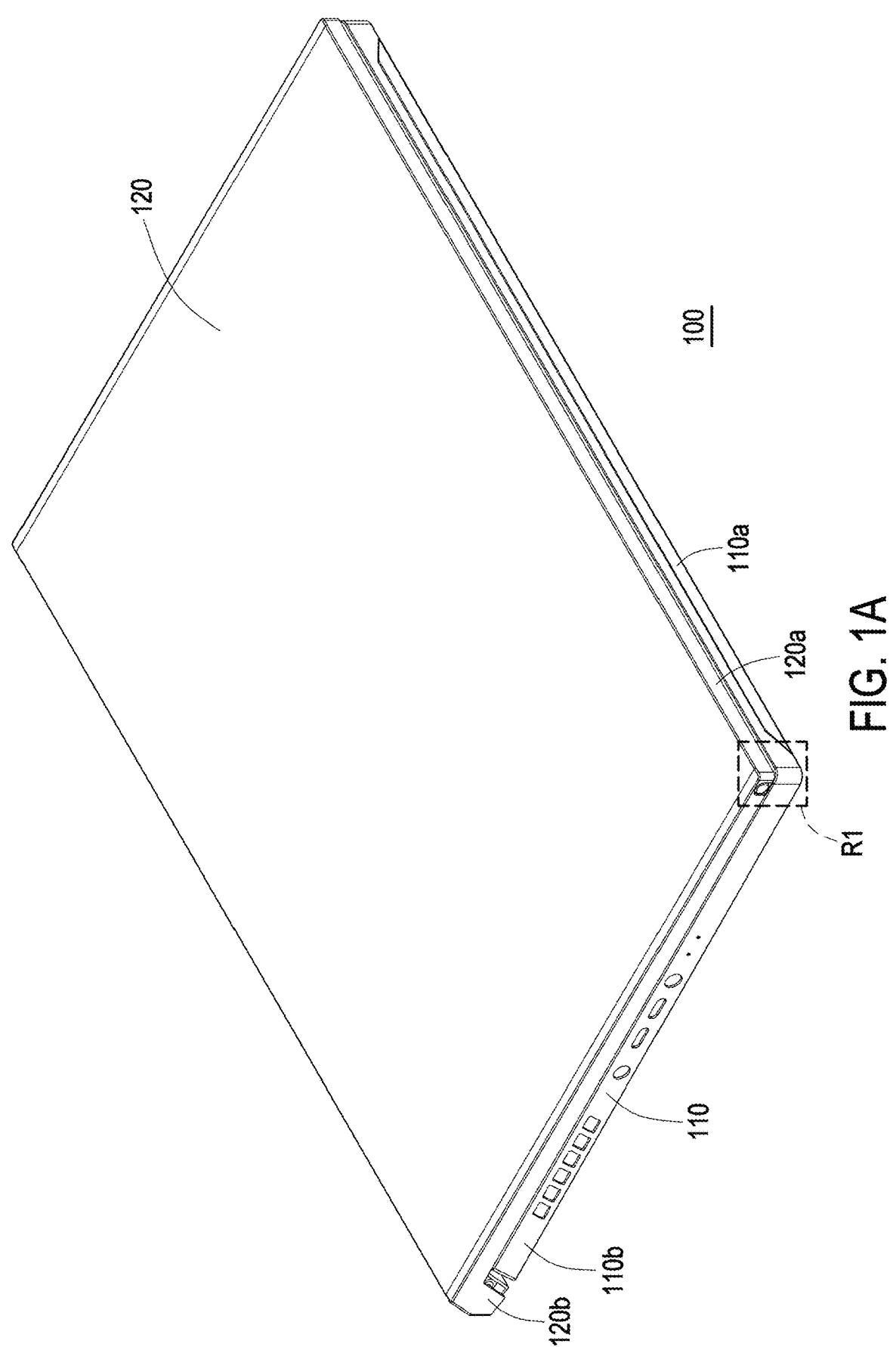
FIG. 1A is a schematic diagram of an electronic device in a first state according to an embodiment of the present invention.
Figure 1B:
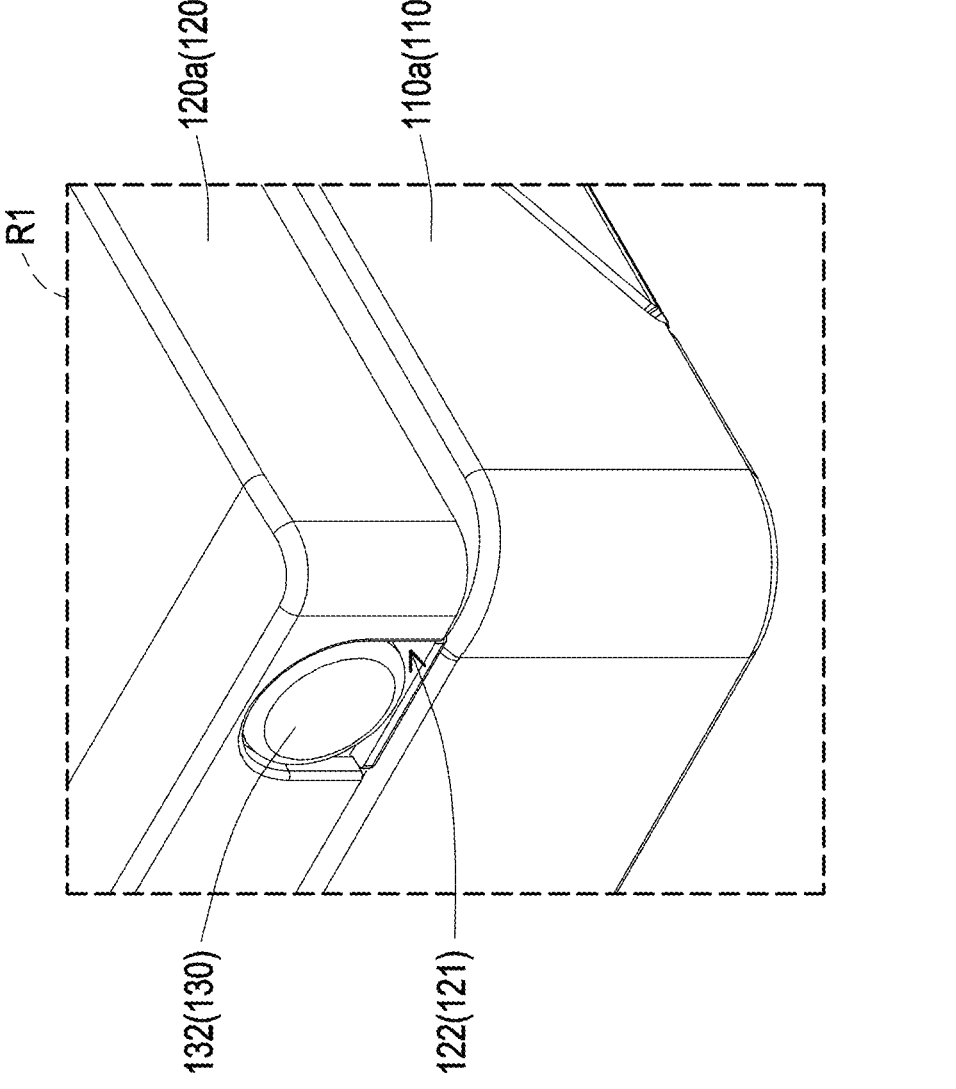
FIG. 1B is an enlarged schematic diagram of region R1 of FIG. 1A.

FIG. 1A is a schematic diagram of an electronic device in a first state according to an embodiment of the present invention. FIG. 1B is an enlarged schematic diagram of region R1 of FIG. 1A. Referring to FIG. 1A and FIG. 1B, in the embodiment, the electronic device 100 can be a notebook computer and includes a first body 110, a second body 120 and a stylus 130. The second body 120 is pivotally connected to the first body 110, and the stylus 130 is removably accommodated in the second body 120. In details, the second body 120 has a stylus slot 121 for storing the stylus 130. In the first state, the second body 120 is folded relative to the first body 110, and the stylus 130 is accommodated and fixed in the stylus slot 121. In this way, it is not only facilitates carrying the stylus 130, but also prevents the stylus 130 from being lost.

As shown in FIG. 1B, an opening 122 of the stylus slot 121 is located on the side of the second body 120. When the stylus 130 is accommodated and fixed in the stylus slot 121, the end of the stylus 130 is exposed at the opening 122, but does not protrude from the side of the second body 120. Therefore, the integrity and beauty of the appearance of the electronic device 100 can be maintained while preventing the stylus 130 from being damaged by external objects or external forces.

As shown in FIG. 1A and FIG. 1B, the first body 110 has a front end 110a and a back end 110b opposite the front end 110a, and the second body 120 has a top end 120a and a bottom end 120b opposite the top end 120a. In details, the stylus slot 121 is disposed on the top end 120a, and the bottom end 120b is pivotally connected to the back end 110b.

Figure 2A:
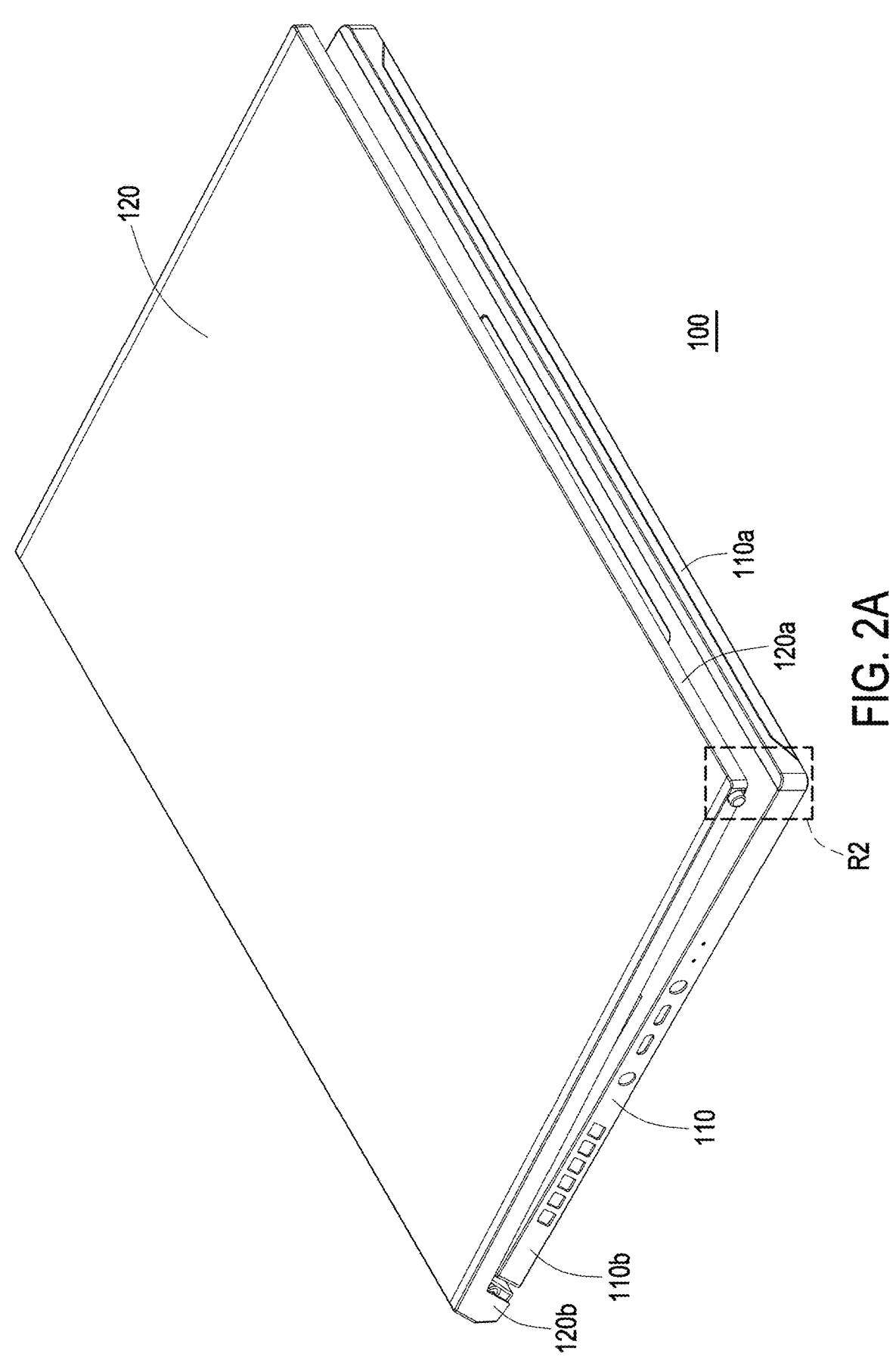
FIG. 2A is a schematic diagram of the electronic device of FIG. 1A transitioning to a second state.
Figure 2B:
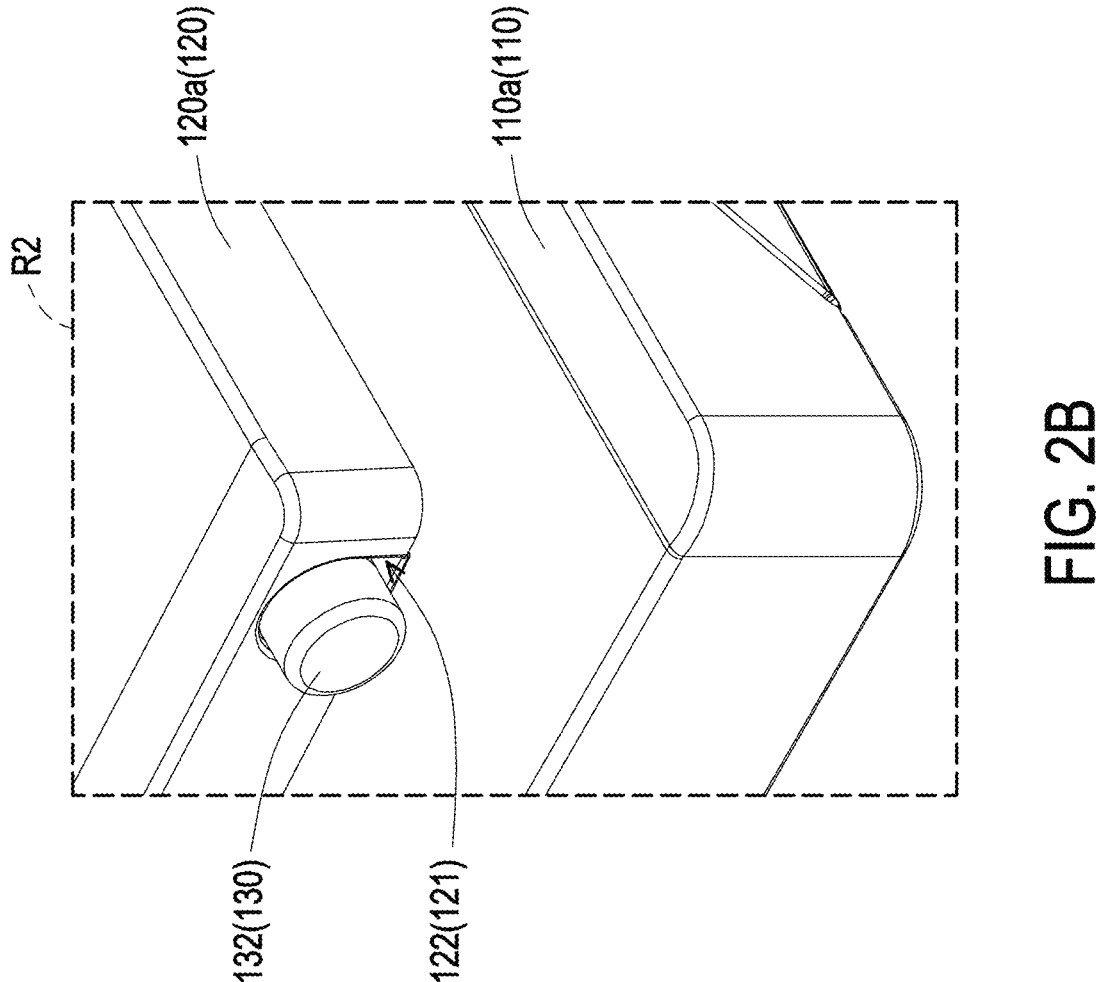
FIG. 2B is an enlarged schematic diagram of region R2 of FIG. 2A.

FIG. 2A is a schematic diagram of the electronic device of FIG. 1A transitioning to a second state. FIG. 2B is an enlarged schematic diagram of region R2 of FIG. 2A. As shown in FIG. 1A and FIG. 2A, or, as shown in FIG. 1B and FIG. 2B, when the second body 120 is unfolded relative to the first body 110 to transition to the second state, the distance between the top end 120a of the second body 120 and the front end 110a of the first body 110 increases. On the other hand, the end of the stylus 130 automatically moves out of the stylus slot 121 and protrudes from the side of the second body 120 where the opening 122 is located, so that the user can quickly extract the stylus 130. Therefore, the electronic device 100 has excellent operational convenience.

Figure 3A:
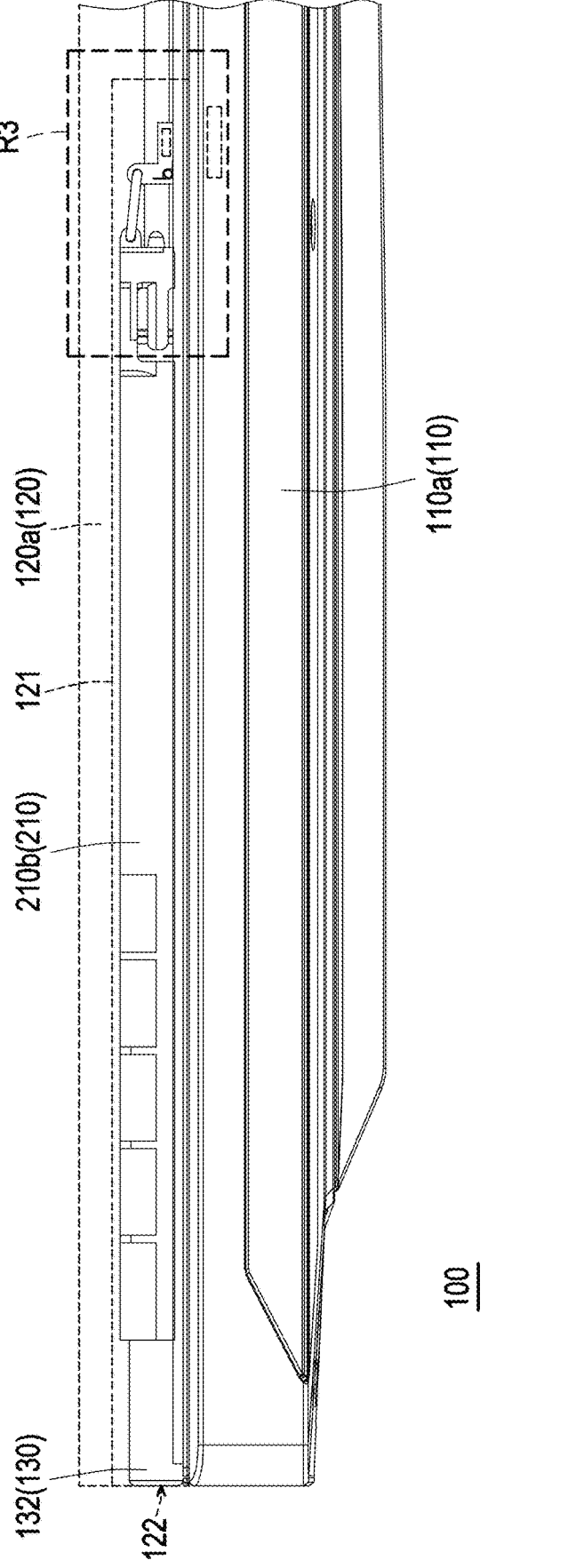
FIG. 3A is a partially enlarged schematic diagram of the electronic device of FIG. 1A from another perspective.
Figure 3B:
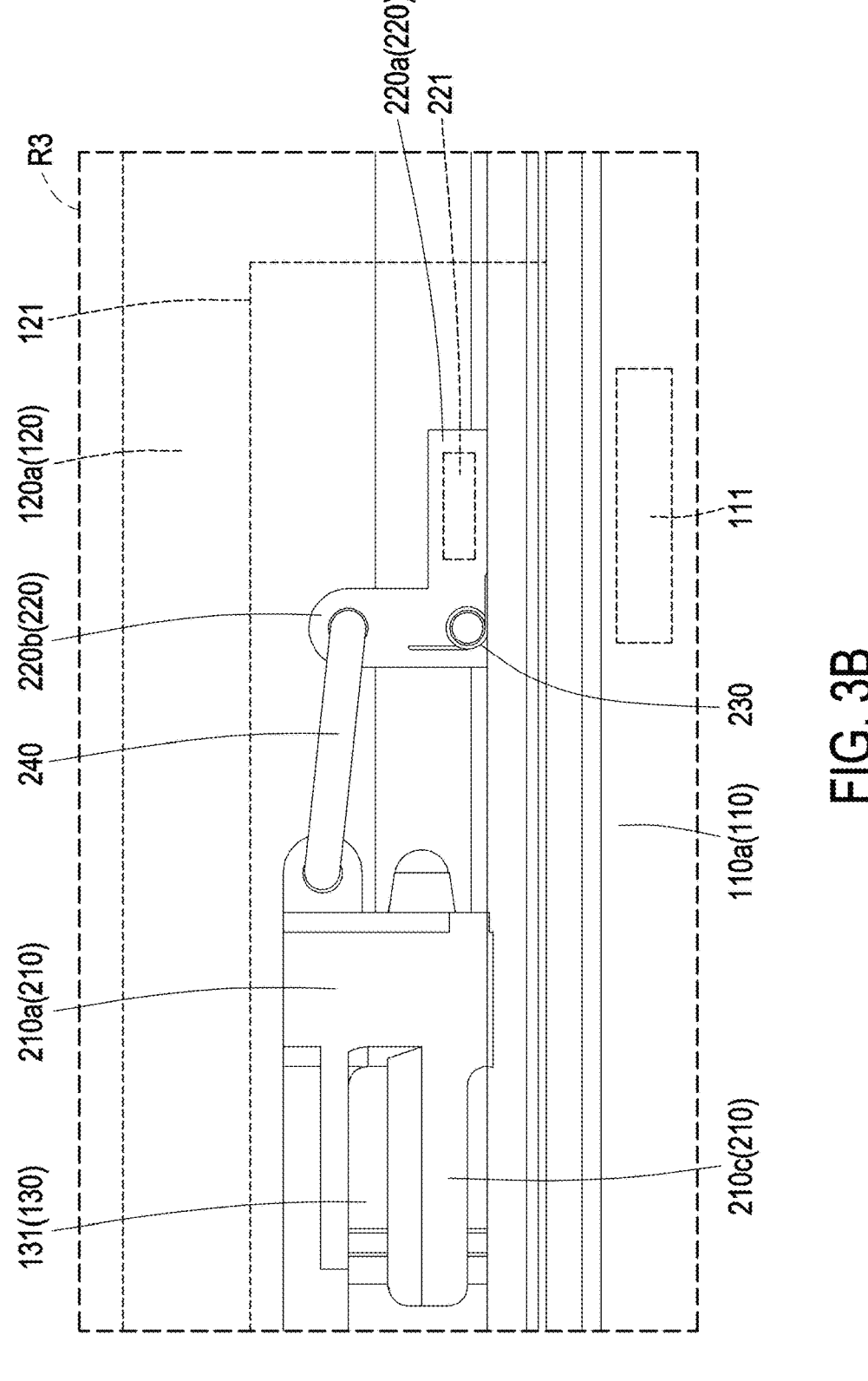
FIG. 3B is an enlarged schematic diagram of region R3 of FIG. 3A.
Figure 4A:
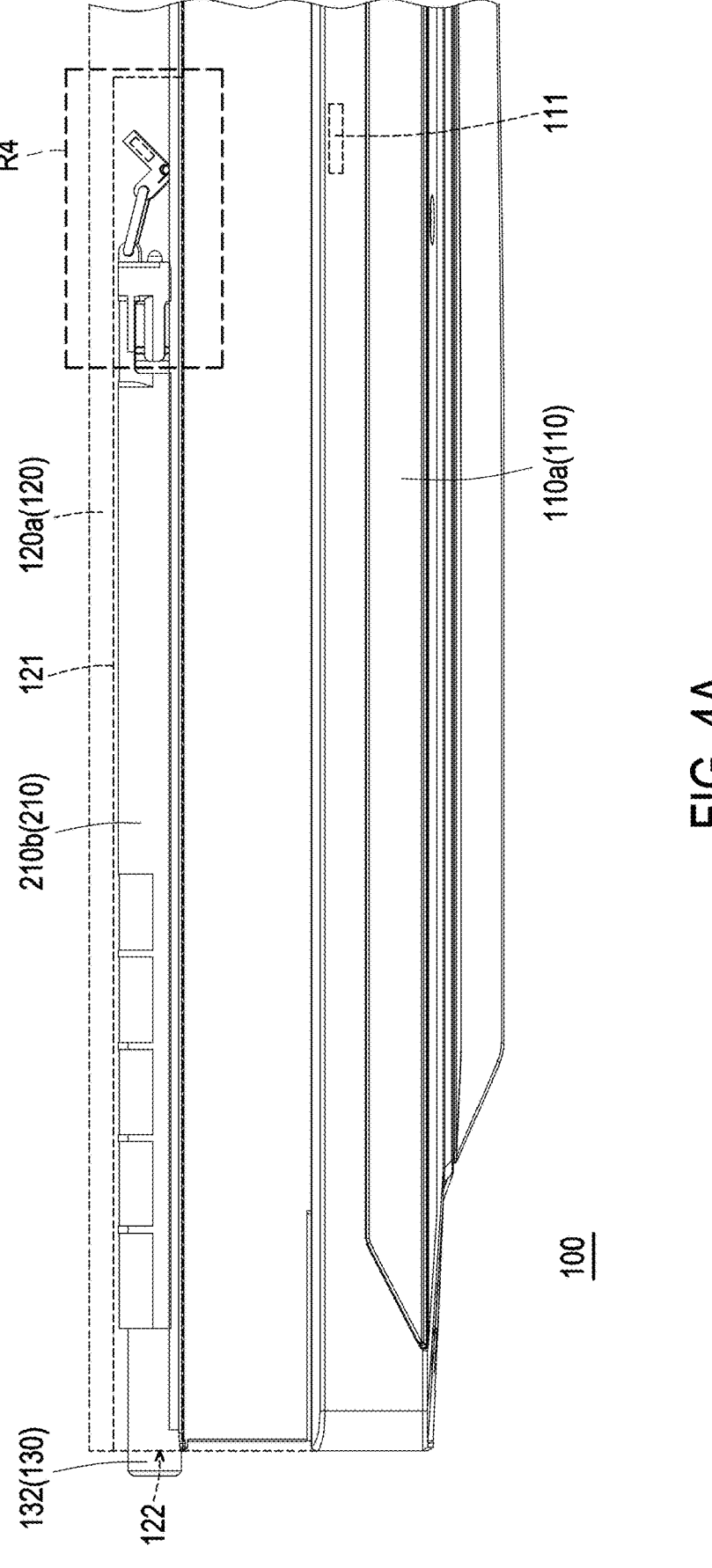
FIG. 4A is a partially enlarged schematic diagram of the electronic device of FIG. 2A from another perspective.
Figure 4B:
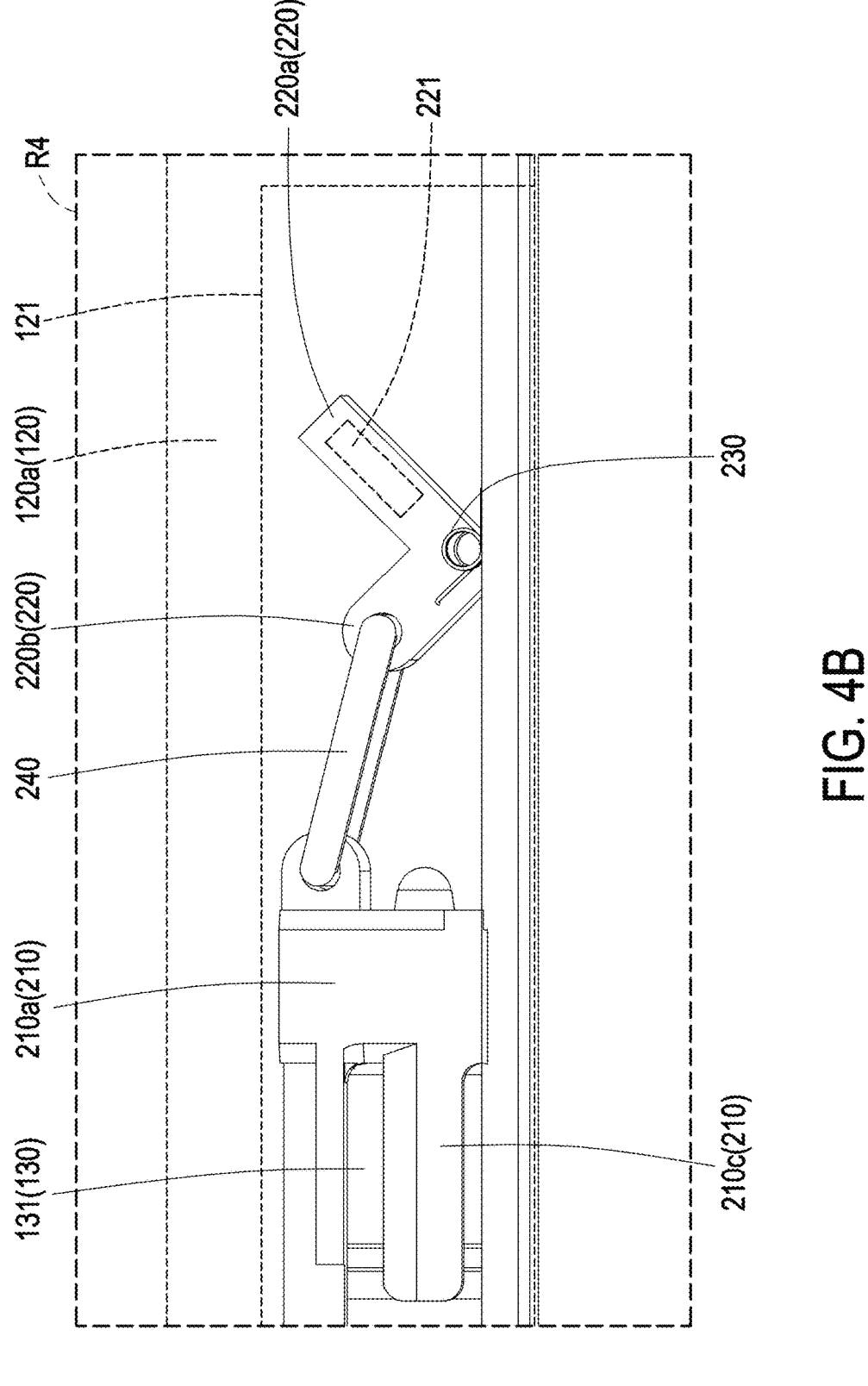
FIG. 4B is an enlarged schematic diagram of region R4 of FIG. 4A.

FIG. 3A is a partially enlarged schematic diagram of the electronic device of FIG. 1A from another perspective. FIG. 3B is an enlarged schematic diagram of region R3 of FIG. 3A. FIG. 4A is a partially enlarged schematic diagram of the electronic device of FIG. 2A from another perspective. FIG. 4B is an enlarged schematic diagram of region R4 of FIG. 4A. Referring to FIG. 1A, FIG. 1B, FIG. 3A and FIG. 3B, in the embodiment, the first body 110 is provided with a first magnetic component 111 corresponding to the stylus slot 121 at the front end 110a, and the first magnetic component 111 is adapted to generate magnetic attraction force for positioning the stylus 130. On the other hand, the electronic device 100 further includes a positioning mechanism 200, wherein the positioning mechanism 200 is located at the top end 120a of the second body 120 and is disposed in the stylus slot 121.

As shown in FIG. 1B, FIG. 3A and FIG. 3B, the positioning mechanism 200 includes a positioning base 210, a driving part 220, an elastic part 230 and a driven part 240, wherein the stylus 130 is fixed to the positioning base 210, and the positioning base 210 is adapted to slide in the stylus slot 121. Furthermore, the stylus 130 has a first end 131 (such as a nib) and a second end 132 (such as an end) opposite to the first end 131, wherein the first end 131 is fixed to the positioning base 210, and the second end 132 is exposed at the opening 122.

In the embodiment, the stylus 130 is adapted to slide synchronously with the positioning base 210 within the stylus slot 121 and slide between a first position shown in FIG. 3A and a second position shown in FIG. 4A. When the stylus 130 and the positioning base 210 are maintained in the first position as shown in FIG. 3A, the second end 132 of the stylus 130 does not protrude from the side of the second body 120 where the opening 122 is located. When the positioning base 210 slides in a direction where the opening 122 is located to the second position as shown in FIG. 4A, the stylus 130 slides synchronously with the positioning base 210, and the second end 132 protrudes from the side of the second body 120 where the opening 122 is located, so as to facilitate the user to quickly extract the stylus 130.

As shown in FIG. 3A and FIG. 3B, the driving part 220 is pivotally connected to the second body 120 and is provided with a second magnetic component 221 corresponding to the first magnetic component 111. The elastic part 230 can be a torsion spring, and two ends of the elastic part 230 are respectively connected to the driving part 220 and the second body 120. On the other hand, two ends of the driven part 240 are respectively connected to the driving part 220 and the positioning base 210, wherein the driven part 240 is located between the driving part 220 and the positioning base 210, and the positioning base 210 is located between the driven part 240a and the opening 122 of the stylus slot 121. For example, two ends of the driven part 240 are pivotally connected to the driving part 220 and the positioning base 210 respectively.

In the first state, the top end 120a of the second body 120 can be attached to the front end 110a of the first body 110, and a first magnetic attraction force is generated between the second magnetic component 221 and the first magnetic component 111. In the first state, the distance between the second magnetic component 221 and the first magnetic component 111 is the shortest, and the first magnetic attraction force can be the maximum magnetic attraction force that can be generated between the second magnetic component 221 and the first magnetic component 111.

In the first state, the positioning base 210 remains in the first position, and the elastic part 230 is squeezed by the driving part 220. Since the first magnetic attraction force generated between the second magnetic component 221 and the first magnetic component 111 is greater than an elastic restoring force of the elastic part 230, the driving part 220, the driven part 240 and the positioning base 210 can be locked to prevent the driving part 220, the driven part 240 and the positioning base 210 from malfunctioning.

As shown in FIG. 4A and FIG. 4B, when the second body 120 is unfolded relative to the first body 110 to transition to the second state, the distance between the top end 120a of the second body 120 and the front end 110a of the first body 110 increases, and the distance between the second magnetic component 221 and the first magnetic component 111 also increases.

Further speaking, during the transition of the electronic device 100 from the first state (as shown in FIG. 3A and FIG. 3B) to the second state (as shown in FIG. 4A and FIG. 4B), the magnetic attraction force generated between the second magnetic component 221 and the first magnetic component 111 weakens from the first magnetic attraction force to a second magnetic attraction force, and the second magnetic attraction force is less than the elastic restoring force of the elastic part 230. Therefore, the elastic part 230 can drive the driving part 220 to rotate, and the driven part 240 is driven by the driving part 220 to push the positioning base 210 to the opening 122 of the stylus slot 121, so that the positioning base 210 slides to the second position. At the same time, the stylus 130 slides synchronously with the positioning base 210, and the second end 132 is moved out of the stylus slot 121.

That is to say, the magnetic attraction force generated between the second magnetic component 221 and the first magnetic component 111 weakens as an expansion angle of the second body 120 relative to the first body 110 increases. Once the magnetic attraction force generated between the second magnetic component 221 and the first magnetic component 111 is less than the elastic restoring force of the elastic part 230, the elastic restoring force of the elastic part 230 can drive the driving part 220 to rotate in the stylus slot 121. At the same time, the driving part 220 can drive the positioning base 210 to slide toward the opening 122 in the stylus slot 121 through the driven part 240, so that the second end 132 of the stylus 130 automatically moves out of the stylus slot 121 when the second body 120 is unfolded relative to the first body 110.

As shown in FIG. 3B and FIG. 4B, the driving part 220 includes a first driving part 220a and a second driving part 220*b*, and the second magnetic component 221 is disposed in the first driving part 220*a*. The second driving part 220*b* is connected to the first driving part 220*a*, and the driven part 240 is connected to the second driving part 220*b*. When the first driving part 220*a* is attached to a bottom surface of the stylus slot 121, and the positioning base 210 remains at the first position (as shown in FIG. 3A). When the elastic restoring force of the elastic part 230 is greater than the magnetic attraction force generated between the second magnetic component 221 and the first magnetic component 111, the elastic part 230 drives the driving part 220 to rotate in the stylus slot 121, causing the first driving part 220*a* to move away from the bottom surface of the stylus slot 121. And the second driving part 220*b* pushes the positioning base 210 to slide toward the second position (as shown in FIG. 3B) through the driven part 240.

As shown in FIG. 3A, the positioning base 210 remains in the first position and is at a first distance away from the opening 122 of the stylus slot 121. As shown in FIG. 4A, the positioning base 210 slides to the second position and is at a second distance less than the first distance away from the opening 122 of the stylus slot 121.

Figure 5A:
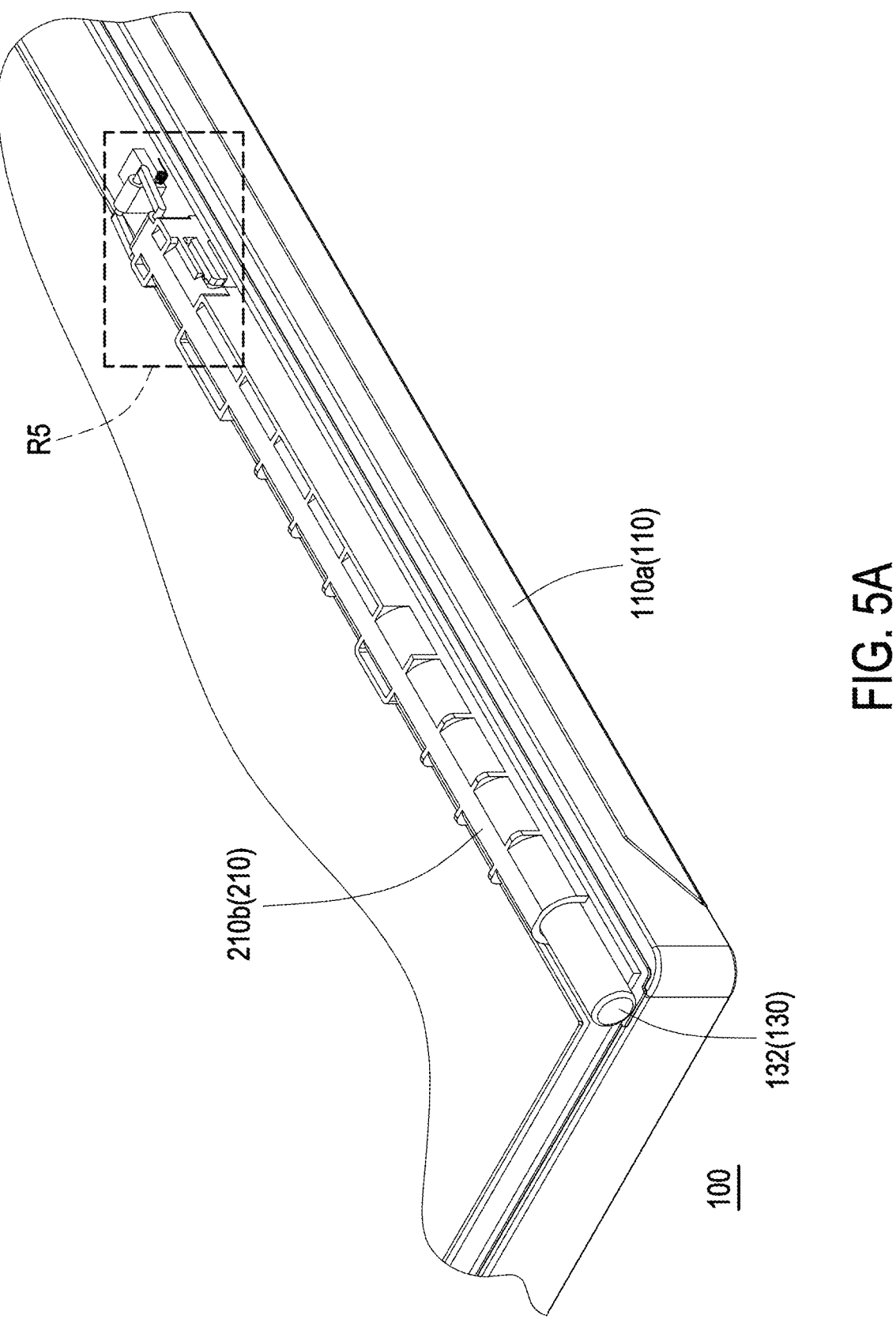
FIG. 5A is a partially enlarged schematic diagram of an internal structural configuration of the second body of FIG. 1A.
Figure 5B:
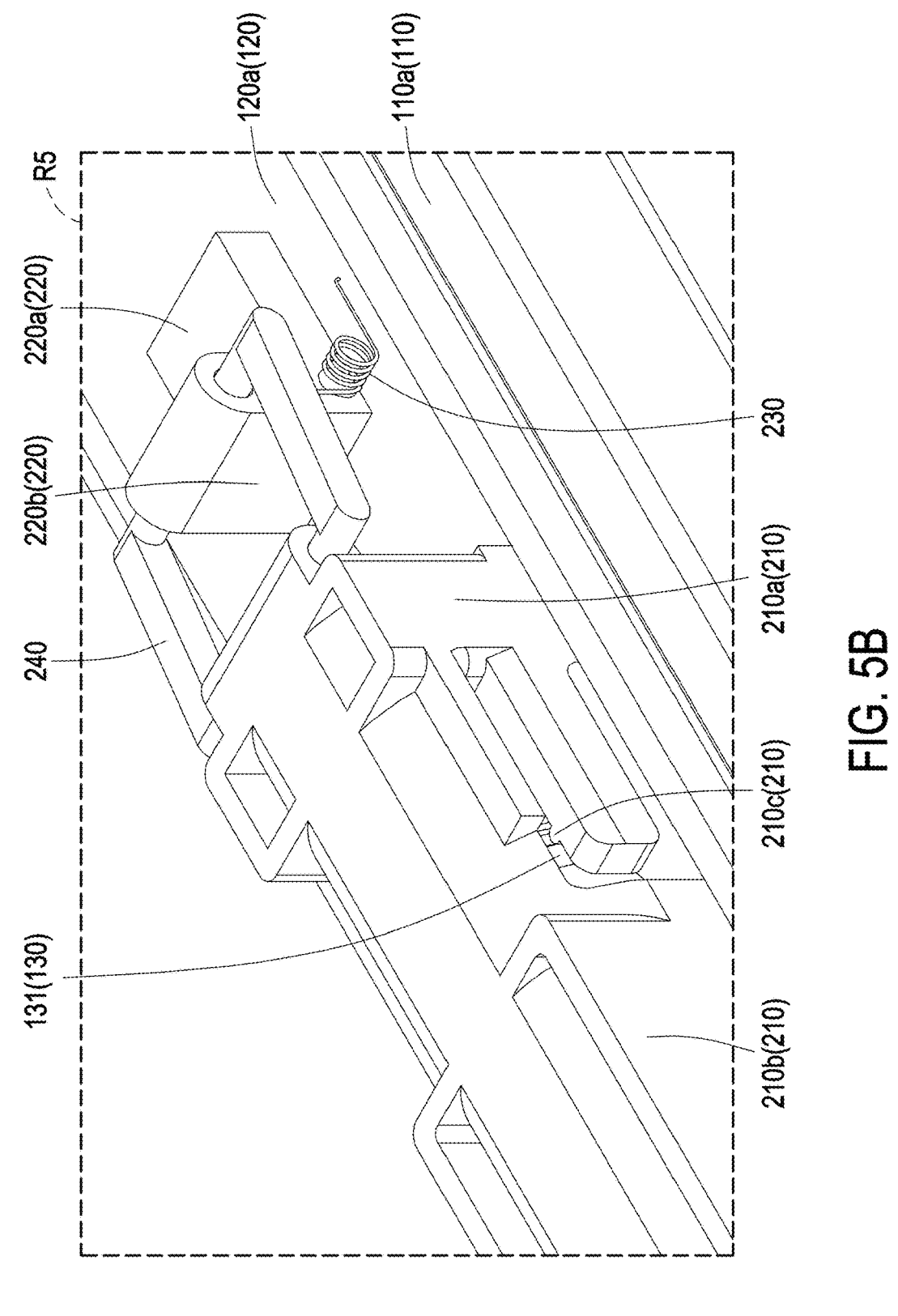
FIG. 5B is an enlarged schematic diagram of region R5 of FIG. 5A.

FIG. 5A is a partially enlarged schematic diagram of an internal structural configuration of the second body of FIG. 1A, and the illustration of part of the casing of the second body 120 (such as back cover) is omitted. FIG. 5B is an enlarged schematic diagram of region R5 of FIG. 5A. Referring to FIG. 5A and FIG. 5B, in the embodiment, the positioning base 210 includes a first positioning part 210*a* and a second positioning part 210*b*, and the driven part 240 is connected to the first positioning part 210*a*. Besides, the second positioning part 210*b* is connected to the first positioning part 210*a* and is located between the first positioning part 210*a* and the opening 122 of the stylus slot 121.

In details, the stylus 130 passes through the second positioning part 210*b*, and the first end 131 of the stylus 130 is inserted into the first positioning part 210*a*. In the embodiment, the positioning base 210 further includes a positioning hook 210*c* disposed in the first positioning part 210*a*, and the positioning hook 210*c* snaps onto the first end 131 of the stylus 130 to fix the stylus 130 on the positioning base 210. For example, the positioning hook 210*c* can be an elastic arm-type hook extending from the first positioning part 210*a* to the second positioning part 210*b*.

As shown in FIG. 2B and FIG. 5B, after the second end 132 of the stylus 130 is automatically moved out of the stylus slot 121, the user can apply force to grab the second end 132 of the stylus 130 and release the positioning hook 210*c* from the first end 131 of the stylus 130 to quickly pull the stylus 130 out of the stylus slot 121.

For example, before retracting the stylus 130 to the stylus slot 121, the user must first let the second body 120 be folded relative to the first body 110. Then, the first end 131 of the stylus 130 is inserted into the stylus slot 121, and the second end 132 is pushed in the direction where the opening 122 is located. In details, the first end 131 of the stylus 130 first passes through the second positioning part 210*b*, then is inserted into the first positioning part 210*a*, and is finally engaged and fixed to the first positioning part 210*a* by the positioning hook 210*c*.

In details, once the first end 131 of the stylus 130 contacts the first positioning part 210*a*, the entire positioning base 210 can be pushed by the stylus 130 and slide in the stylus slot 121 in the direction away from the opening 122. In details, the positioning base 210 drives the driving part 220 to rotate in the stylus slot 121 through the driven part 240, and causes the second magnetic component 221 to rotate towards the first magnetic component 111, so that the magnetic attraction force generated between the second magnetic component 221 and the first magnetic component 111 is greater than the elastic restoring force of the elastic part 230 squeezed by the driving part 220. Thereby, the driving part 220, the driven part 240 and the positioning base 210 is locked to prevent the driving part 220, the driven part 240 and the positioning base 210 from malfunctioning.

In summary, when the second body is folded relative to the first body, since the magnetic attraction force generated between the first magnetic component and the second magnetic component is greater than the elastic restoring force of the squeezed elastic part, the positioning mechanism can be locked to prevent the positioning mechanism from malfunctioning. When the second body is unfolded relative to the first body, since the magnetic attraction force generated between the first magnetic component and the second magnetic component weakens to less than the elastic restoring force of the elastic part, causing the positioning mechanism to move under the elastic restoring force, and move at least part of the stylus out of the stylus slot, so that the user can quickly extract the stylus. Therefore, the electronic device of the present invention has excellent operational convenience.

Although the present invention has been disclosed above by the embodiments, it is not intended to limit the present invention, and any person with ordinary knowledge in the technical field is not intended to limit the present invention. Slight changes and modifications may be made without departing from the spirit and scope of the present invention, so the protection scope of the present invention should be determined by the following claims.

What is claimed is:

1. An electronic device, comprising:
   a first body, having a first magnetic component;
   a second body, pivotally connected to the first body and has a stylus slot;
   a stylus, accommodated in the stylus slot; and
   a positioning mechanism, disposed in the stylus slot, and comprises a positioning base, a driving part, an elastic part and a driven part, wherein the stylus is fixed to the positioning base and the positioning base is adapted to slide in the stylus slot, the driving part is pivotally connected to the second body and has a second magnetic component corresponding to the first magnetic component, two ends of the elastic part are respectively connected to the driving part and the second body, and two ends of the driven part are respectively connected to the driving part and the positioning base,
   when the second body is folded relative to the first body, the positioning base remains in a first position, wherein the elastic part is squeezed by the driving part, and an elastic restoring force of the elastic part is less than a first magnetic attraction force generated between the second magnetic component and the first magnetic component,
   when the second body is unfolded relative to the first body, the elastic restoring force of the elastic part is greater than a second magnetic attraction force generated between the second magnetic component and the first magnetic component to drive the driving part to rotate, and the driven part is driven by the driving part to push the positioning base toward an opening of the stylus slot, causing the positioning base to slide to a second position.

2. The electronic device according to claim 1, wherein the stylus has a first end and a second end opposite to the first end, the first end is fixed to the positioning base, and the second end is exposed at the opening of the stylus slot.

3. The electronic device according to claim 2, wherein the positioning base comprises a first positioning part and a second positioning part, and the driven part is connected to the first positioning part, the second positioning part is connected to the first positioning part and is between the first positioning part and the opening of the stylus slot, the stylus passes through the second positioning part, and the first end of the stylus is inserted into the first positioning part.

4. The electronic device according to claim 3, wherein the positioning base further comprises a positioning hook disposed in the first positioning part, and the positioning hook snaps onto the first end of the stylus.

5. The electronic device according to claim 1, wherein the driven part is located between the driving part and the positioning base, and the positioning base is located between the driven part and the opening of the stylus slot.

6. The electronic device according to claim 1, wherein magnetic attraction force generated between the second magnetic component and the first magnetic component weakens as an expansion angle of the second body relative to the first body increases.

7. The electronic device according to claim 1, wherein the second body has a top end and a bottom end opposite to the top end, and the bottom end is pivotally connected to the first body, the stylus slot is disposed on the top end.

8. The electronic device according to claim 7, wherein the first body has a front end and a back end opposite to the front end, and the bottom end of the second body is pivotally connected to the back end, the first magnetic component is disposed on the front end.

9. The electronic device according to claim 1, wherein the driving part comprises a first driving part and a second driving part, and the first magnetic component is disposed in the first driving part, the second driving part is connected to the first driving part, and the driven part is connected to the second driving part, when the first driving part is attached to a bottom surface of the stylus slot, and the positioning base remains at the first position, when the first driving part moves away from the bottom surface of the stylus slot, the positioning base slides toward the second position.

10. The electronic device according to claim 1, wherein the clastic part is a torsion spring.

* * * * *